Patented Apr. 24, 1928.

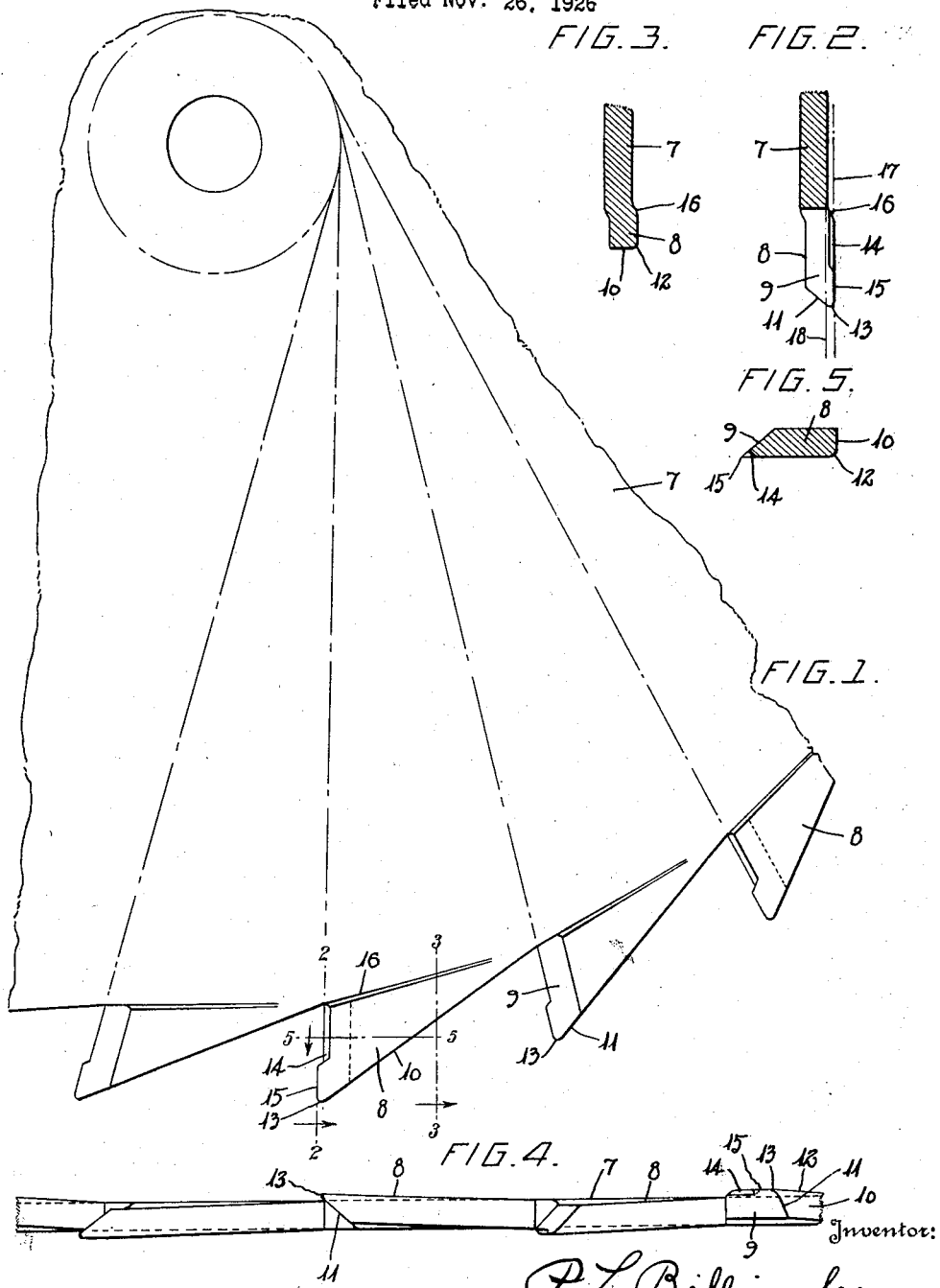

1,666,987

UNITED STATES PATENT OFFICE.

PERCY LEON BILLINGSLEY, OF ORLANDO, FLORIDA, ASSIGNOR OF ONE-FOURTH TO M. O. EVERSTREET, OF ORLANDO, FLORIDA.

SAW TOOTH.

Application filed November 26, 1926. Serial No. 150,950.

The present invention relates to wood saws, and aims to provide a saw having teeth of novel and improved formation which may be used for both ripping and cutting off or cross-cutting, which will cut smoothly and rapidly without scarring or marking the lumber, and which will retain the set thereof much longer than with the usual spring set teeth.

With the foregoing and other objects in view, which will be apparent as the invention is more fully described hereinafter, the invention resides in the formation and details of the teeth as hereinafter set forth, it being understood that changes can be made within the scope of what is hereinafter claimed without departing from the spirit of the invention.

The invention is illustrated in the accompanying drawing, wherein—

Figure 1 is a fragmentary elevation of several saw teeth as embodied in a circular saw.

Figs. 2 and 3 are sections on the respective lines 2—2 and 3—3 of Fig. 1.

Fig. 4 is an edge view of the saw blade shown in Fig. 1 looking upwardly.

Fig. 5 is a sectional detail on the line 5—5 of Fig. 1.

The saw blade 7, as shown in Fig. 1, is of circular form and has the teeth 8 at its periphery, although it will be apparent that the teeth may be used on a rectilinear saw as well as on a circular saw. The blade 7 is composed of a plate of steel or other suitable spring metal.

The teeth 8 are right hand and left hand teeth alternately so as to cut the wood at the opposite sides of the blade, and each tooth has the face 9 and the back 10, which converge from the base of the tooth to the apex edge 11. The face and back are both inclined forwardly or in the direction of movement of the teeth, although such inclination of the face 9 is slight while the inclination of the back 10 is necessarily greater. The face 9 of the tooth is disposed in a plane arranged obliquely and at an angle of substantially 45 degrees relatively to the plane of the blade 7, while the back 10 is disposed in a plane substantially at right angles to the plane of the blade. The edge 11 is disposed in the line of intersection of the planes of the face and back of the tooth, so that the edge 11 is disposed obliquely or inclined with reference to the plane of the blade.

Each tooth 8 is offset at its base, as at 16, toward the side of the blade opposite that side toward the face 9 of the tooth faces, and the tooth is offset the maximum amount at its forward end and the amount of offsetting gradually decreases to the rear end of the tooth which is in the plane of the blade. The tooth is thus offset at an angle (substantially two degrees as shown) to the plane of the blade. That side of the tooth which is offset outwardly beyond the corresponding side of the tooth will be termed the outer side, while the other side of the tooth which is offset inwardly will be termed the inner side.

The face 9 of the tooth is arranged at an acute angle with the outer side of the tooth and at an obtuse angle with the inner side of the tooth, while the back 10 of the tooth is arranged at right angles with both sides. The outer edge of the tooth between the outer side and back 10 is rounded, as at 12, thereby producing a rounded nose or point 13 which provides for smooth cutting action, and the face 9 and back 10 being arranged at an acute angle with one another provide the sharp cutting edge 11 which extends inwardly at an angle from the cutting point 13.

The portion of the tooth between the face 9 and the outer side of the tooth is bevelled off, as at 14, from the base or offset 16 of the tooth to a point short of the point or nose 13 of the tooth, leaving a sharp acute angled cutting edge 15 between the point 13 and bevel 14 which does the plane cutting of the saw while the cutting edges 11 cut the wood between the planes of the edges 15 at the opposite sides of the saw.

The teeth are spring set and in the arrangement shown the set will be long lasting and the cutting edges 15 will cut the wood smoothly and rapidly. The rounded points 13 will prevent the cut surfaces of the wood being scarred or marked, and the rounded edges 12 assist in preventing such scarring or marking. The bevels 14 will prevent the teeth from having a tendency to spring outwardly into the wood, and the bevels 14 being reverse to the bevels of the faces 9 will counteract the tendency for the edges 15 to lead into the wood away from the plane of the blade. This also prevents lateral vibration of the teeth 8 and thereby adds materially in preventing the scarring or marking of the wood by the saw teeth. Although the edges 15 may have a tendency to spring or lead outwardly into the wood away from the plane of the blade, the bevels 14 will immediately contact with and ride against the wood to overcome such tendency. The bevels 14 may even have lighter pressure against or contact with the wood than the edges 15, but the benefit of said bevels is present nevertheless. The present teeth provide for efficient performance of the saw for fast and smooth cutting, either for ripping or for cutting off or cross cutting.

The teeth 8 are not only disposed obliquely of the plane of the blade 7 in edge view, as seen in Fig. 4, but also disposed obliquely of said plane in front view, as seen in Fig. 2. Thus, the outer side of each tooth is disposed in a plane 17 disposed at an angle of about one degree with the plane 18 of the corresponding side of the blade 7. This will provide a clearance between the outer side of each tooth and the cut surface of the wood, excepting along the cutting edge 15.

Having thus described the invention, what is claimed as new is:—

1. A saw whose teeth have bevelled faces with those edges between said faces and outer sides of the teeth forming cutting edges and being terminated within the height of the teeth by bevels reverse to the bevels of said faces.

2. A saw whose teeth are offset at the bases thereof and which have bevelled faces with those edges between said faces and outer sides of the teeth forming cutting edges and being terminated within the height of the teeth of bevels reverse to the bevels of said faces.

3. A saw whose teeth are offset at the bases thereof with the amount of offsetting decreasing from the forward to the rear ends of the teeth, said teeth having bevelled faces forming cutting edges at the outer sides of the teeth, and said cutting edges being terminated within the height of teeth by bevels reverse to the bevels of said faces.

4. A saw comprising a blade provided with teeth having bevelled faces arranged obliquely relatively to the plane of the blade and having backs arranged at substantially right angles to the plane of the blade, with oblique cutting edges between said faces and backs of the teeth, said teeth being offset at the bases thereof, the bevelled faces of the teeth forming cutting edges at the outer sides of the teeth, said cutting edges being terminated within the height of the teeth by bevels reverse to the bevels of said faces.

5. A saw comprising a blade provided with teeth having bevelled faces arranged obliquely relatively to the plane of the blade and having backs arranged at substantially right angles to the plane of the blade, with oblique cutting edges between said faces and backs of the teeth, the teeth being offset at the bases thereof with the amount of offsetting decreasing from the forward to the rear ends of the teeth, said bevelled faces forming cutting edges at the outer sides of the teeth, said cutting edges being terminated within the height of the teeth by bevels reverse to the bevels of said faces, and the outer edges of the teeth between the backs and outer sides thereof being rounded to the points of the teeth.

In testimony whereof I hereunto affix my signature.

PERCY LEON BILLINGSLEY.